United States Patent
Okada et al.

(10) Patent No.: US 9,309,388 B2
(45) Date of Patent: Apr. 12, 2016

(54) RUBBER COMPOSITION, METHOD FOR PRODUCING SAME, AND TIRE

(75) Inventors: Koji Okada, Tokyo (JP); Ryoji Tanaka, Tokyo (JP)

(73) Assignee: JSR CORPORATION, Tokyo (JP)

(*) Notice: Subject to any disclaimer, the term of this patent is extended or adjusted under 35 U.S.C. 154(b) by 91 days.

(21) Appl. No.: 13/985,471

(22) PCT Filed: Feb. 14, 2012

(86) PCT No.: PCT/JP2012/053320
§ 371 (c)(1),
(2), (4) Date: Aug. 14, 2013

(87) PCT Pub. No.: WO2012/111640
PCT Pub. Date: Aug. 23, 2012

(65) Prior Publication Data
US 2013/0324657 A1 Dec. 5, 2013

(30) Foreign Application Priority Data
Feb. 14, 2011 (JP) .................... 2011-028252

(51) Int. Cl.
*C08L 9/00* (2006.01)
*C08K 3/36* (2006.01)
*C08L 9/06* (2006.01)
*B60C 1/00* (2006.01)

(52) U.S. Cl.
CPC .................. *C08L 9/06* (2013.01); *B60C 1/0016* (2013.04); *C08L 9/00* (2013.01); *C08K 3/36* (2013.01)

(58) Field of Classification Search
USPC .................................................. 524/521, 523
See application file for complete search history.

(56) References Cited

U.S. PATENT DOCUMENTS

| 2003/0065132 A1* | 4/2003 | Bauerle ............... C08F 214/265 528/401 |
| 2003/0125467 A1* | 7/2003 | Akema et al. ................. 525/208 |
| 2008/0249240 A1* | 10/2008 | Bandyopadhyay ...... C08K 5/14 524/847 |
| 2010/0152370 A1 | 6/2010 | Steinhauser et al. |
| 2013/0172481 A1* | 7/2013 | Okada et al. .................. 524/575 |

FOREIGN PATENT DOCUMENTS

| JP | 2009-179754 | 8/2009 |
| JP | 2010-95724 | 4/2010 |
| WO | WO 02/00779 A1 | 1/2002 |

OTHER PUBLICATIONS

Combined Office Action and Search Report issued Sep. 4, 2014 in Chinese Patent Application No. 201280006853.5 (with English translation).
U.S. Appl. No. 14/000,072, filed Aug. 16, 2013, Yuasa, et al.
U.S. Appl. No. 13/984,753, filed Aug. 9, 2013, Shibata, et al.
U.S. Appl. No. 13/984,749, filed Aug. 9, 2013, Shibata, et al.
International Search Report issued Mar. 13, 2012 in Application No. PCT/JP2012/053320.
U.S. Appl. No. 14/007,156, filed Sep. 24, 2013, Okada, et al.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

Objects of the present invention are to provide a rubber composition that can obtain a rubber elastic body having small rolling resistance and excellent impact resilience and a method for producing the same, and to provide a tire having small rolling resistance and excellent impact resilience. The rubber composition of the present invention is obtained by kneading a rubber component containing 30 to 95% by mass of a conjugated diene polymer (A) and 5 to 70% by mass of cross-linked rubber particles (B) with 20 to 100 parts by mass of silica (C) based on 100 parts by mass of the rubber component.

7 Claims, No Drawings

RUBBER COMPOSITION, METHOD FOR PRODUCING SAME, AND TIRE

TECHNICAL FIELD

The present invention relates to a rubber composition, a method for producing the same, and a tire, and more particularly, for example, to a rubber composition suitable for tire tread use, a method for producing the same, and a tire obtained from the rubber composition.

BACKGROUND ART

As a rubber composition used for tire treads of automobiles, there has conventionally been known one in which carbon black is blended as a reinforcing agent together with a rubber component composed of a conjugated diene rubber.

Further, with a recent increasing demand for a reduction in fuel consumption of automobiles, in order to comply with such a demand, for the purpose of a reduction in rolling resistance of tires, silica has been used as a reinforcing agent.

Then, in the rubber composition in which silica is blended as the reinforcing agent, the silica particles are liable to coagulate with each other and less likely to be uniformly dispersed. Accordingly, in order to solve such a problem, various proposals have been made (for example, see Patent Document 1 and Patent Document 2).

PRIOR-ART DOCUMENTS

Patent Documents

Patent Document 1: JP-A-2010-95724
Patent Document 2: WO02/00779

SUMMARY OF THE INVENTION

Problems to be Solved by the Invention

Then, inventors of the present invention have made intensive studies of rubber compositions in which silica is blended as a reinforcing agent. As a result, it has become clear that when dispersibility of silica in the compositions is excessively increased, there is a problem of failing to obtain sufficient impact resilience in rubber elastic bodies obtained from the rubber compositions.

The present invention has been made on the basis of the circumstances as described above, and an object thereof is to provide a rubber composition that can obtain a rubber elastic body having small rolling resistance and moreover excellent impact resilience and a method for producing the same.

Further, another object of the present invention is to provide a tire having small rolling resistance and moreover excellent impact resilience.

Means for Solving the Problems

A method for producing a rubber composition of the present invention comprises kneading a rubber component containing 30 to 95% by mass of a conjugated diene polymer (A) containing a hydrocarbyloxysilyl group and 5 to 70% by mass of cross-linked rubber particles (B) with 20 to 100 parts by mass of silica (C) based on 100 parts by mass of the rubber component.

In the method for producing a rubber composition of the present invention, it is preferable that the conjugated diene polymer (A) contains at least one functional group selected from the group consisting of a primary amino group, a secondary amino group, a tertiary amino group, a thiol group, an epoxy group, a thioepoxy group, an oxetane group and a hydrocarbylthio group.

In the method for producing a rubber composition of the present invention, it is preferable that a cross-linked rubber constituting the cross-linked rubber particles (B) comprises at least one polymer selected from a rubber polymer selected from the group consisting of isoprene rubber, butadiene rubber, styrene-butadiene copolymerized rubber, styrene-isoprene copolymerized rubber, butadiene-isoprene copolymerized rubber, styrene-butadiene-isoprene copolymerized rubber, styrene-acrylonitrile-butadiene copolymerized rubber, acrylonitrile-butadiene copolymerized rubber, ethylene-α-olefin copolymerized rubber, ethylene-α-olefin-diene copolymerized rubber, chloroprene rubber, halogenated butyl rubber and polysiloxane rubber, and a graft polymer obtained by graft polymerizing a conjugated diene compound and/or a styrene compound to the rubber polymer.

In the method for producing a rubber composition of the present invention, it is preferable that the cross-linked rubber constituting the cross-linked rubber particles (B) is obtained by emulsion polymerization or suspension polymerization, and the contained ratio of a multifunctional compound for forming a cross-linked structure to the whole monomers subjected to a polymerization reaction for obtaining the cross-linked rubber is from 0.5 to 5 parts by mass based on a total of 100 parts by mass of the whole monomers subjected to the polymerization reaction.

In the method for producing a rubber composition of the present invention, it is preferable that the cross-linked rubber constituting the cross-linked rubber particles (B) has a structural unit derived from at least one compound selected from the group consisting of hydroxyethyl methacrylate, hydroxypropyl methacrylate, hydroxybutyl methacrylate, ethylene glycol dimethacrylate, trimethylolpropane trimethacrylate, pentaerythritol tetramethacrylate, tert-butoxydimethylsilylstyrene and isopropoxy-dimethylsilylstyrene.

In the method for producing a rubber composition of the present invention, it is preferable that the average particle size of the cross-linked rubber particles (B) is from 10 to 800 nm.

A rubber composition is obtained by kneading a rubber component containing 30 to 95% by mass of a conjugated diene polymer (A) a containing hydrocarbyloxysilyl group and 5 to 70% by mass of cross-linked rubber particles (B) with 20 to 100 parts by mass of silica (C) based on 100 parts by mass of the rubber component.

In the rubber composition of the present invention, it is preferable the conjugated diene polymer (A) contains at least one functional group selected from the group consisting of a primary amino group, a secondary amino group, a tertiary amino group, a thiol group, an epoxy group, a thioepoxy group, an oxetane group and a hydrocarbylthio group.

In the rubber composition of the present invention, it is preferable that a cross-linked rubber constituting the cross-linked rubber particles (B) comprises at least one polymer selected from a rubber polymer selected from the group consisting of isoprene rubber, butadiene rubber, styrene-butadiene copolymerized rubber, styrene-isoprene copolymerized rubber, butadiene-isoprene copolymerized rubber, styrene-butadiene-isoprene copolymerized rubber, styrene-acrylonitrile-butadiene copolymerized rubber, acrylonitrile-butadiene copolymerized rubber, ethylene-α-olefin copolymerized rubber, ethylene-α-olefin-diene copolymerized rubber, chloroprene rubber, halogenated butyl rubber and polysiloxane rubber, and a graft polymer obtained by graft polymerizing a conjugated diene compound and/or a styrene compound to the rubber polymer.

In the rubber composition of the present invention, it is preferable that the cross-linked rubber constituting the cross-linked rubber particles (B) is obtained by emulsion polymerization or suspension polymerization, and the contained ratio of a multifunctional compound for forming a cross-linked structure to the whole monomers subjected to a polymerization reaction for obtaining the cross-linked rubber is from 0.5 to 5 parts by mass based on a total of 100 parts by mass of the whole monomers subjected to the polymerization reaction.

In the rubber composition of the present invention, it is preferable that the cross-linked rubber constituting the cross-linked rubber particles (B) has a structural unit derived from at least one compound selected from the group consisting of hydroxyethyl methacrylate, hydroxypropyl methacrylate, hydroxybutyl methacrylate, ethylene glycol dimethacrylate, trimethylolpropane trimethacrylate, pentaerythritol tetramethacrylate, tert-butoxydimethylsilylstyrene and isopropoxydimethylsilylstyrene.

In the rubber composition of the present invention, it is preferable that the average particle size of the cross-linked rubber particles (B) is from 10 to 800 nm.

A rubber composition of the present invention comprises a rubber composition wherein at least 20 to 100 parts by mass of silica (C) added based on 100 parts by mass of the rubber component which comprised 30 to 95% by mass of a conjugated diene polymer (A) containing a hydrocarbyloxysilyl group and 5 to 70% by mass of cross-linked rubber particles (B).

A tire of the present invention has a tread obtained from the rubber composition described above.

Effect of the Invention

According to a method for producing a rubber composition of the present invention, a rubber component containing cross-linked rubber particles at a specific ratio together with a conjugated diene polymer containing a hydrocarbyloxysilyl group and silica are kneaded. Therefore, dispersibility of the silica is increased by an action of the conjugated diene polymer containing a hydrocarbyloxysilyl group, and moreover, the silica is rejected by the cross-linked rubber particles, which results in partial uneven distribution of the silica. An excessive increase in dispersibility of the silica is suppressed by such an action of the cross-linked rubber particles.

In a rubber composition of the present invention, silica is blended together with a rubber component, and further, in the rubber component, cross-linked rubber particles are contained at a specific ratio together with a conjugated diene polymer containing a hydrocarbyloxysilyl group. Accordingly, dispersibility of the silica is increased by an action of the conjugated diene polymer containing a hydrocarbyloxysilyl group, and moreover, the silica is rejected by the cross-linked rubber particles, which results in partial uneven distribution of the silica. An excessive increase in dispersibility of the silica is suppressed by such an action of the cross-linked rubber particles, so that dispersibility of the silica is improved from the viewpoint of a balance between rolling resistance and impact resilience in a rubber elastic body obtained from the rubber composition.

According to the rubber composition of the present invention, therefore, the rubber elastic body having small rolling resistance and excellent impact resilience can be obtained.

In a tire of the present invention, a tread is composed of the rubber composition of the present invention, so that rolling resistance is small, and excellent impact resilience is obtained.

MODES FOR CARRYING OUT THE INVENTION

Modes for carrying out the present invention will be described below.

A rubber composition of the present invention is characterized in that at least 20 to 100 parts by mass of silica (C) is added to 100 parts by mass of a rubber component containing 30 to 95% by mass of a conjugated diene polymer (A) containing a hydrocarbyloxysilyl group and 5 to 70% by mass of cross-linked rubber particles (B).

This rubber composition of the present invention is obtained by kneading the conjugated diene polymer (A), the cross-linked rubber particles (B) and the silica (C), and specifically a composition (unvulcanized rubber composition) obtained by kneading the respective elements composing the rubber composition, which forms a rubber elastic body, for example, by performing a crosslinking treatment such as vulcanization.

(Rubber Component)

A rubber component contains the conjugated diene polymer (A) and the cross-linked rubber particles (B) as essential ingredients, and may contain an optional ingredient together with these essential ingredients.

(Conjugated Diene Polymer (A))

The conjugated diene polymer (A) has a hydrocarbyloxysilyl group.

Further, it is preferable that the conjugated diene polymer (A) has at least one functional group (hereinafter also referred to as a "specific functional group") selected from the group consisting of a primary amino group, a secondary amino group, a tertiary amino group, a thiol group, an epoxy group, a thioepoxy group, an oxetane group and a hydrocarbylthio group, together with the hydrocarbyloxysilyl group.

The conjugated diene polymer (A) has the specific functional group together with the hydrocarbyloxysilyl group, so that the conjugated diene polymer (A) has more excellent bonding reactivity to the silica (C), which results in easy formation of chemical bonding (including covalent bonding, hydrogen bonding and an interaction by molecular polarity) with silica. Accordingly, the dispersibility of the silica (C) in the rubber composition is increased, which causes the rubber elastic body obtained from the composition to have smaller rolling resistance.

Here, the conjugated diene polymer having the specific functional group together with the hydrocarbyloxysilyl group includes one having a constitution in which the hydrocarbyloxysilyl group and the specific functional group are each independently present, one having a constitution in which the hydrocarbyloxysilyl group and the specific functional group are present in combination (specifically, for example, one having a constitution in which the specific functional group is present as a substituent group of the hydrocarbyloxysilyl group, or one having a constitution in which the hydrocarbyloxysilyl group is present as a substituent group of the specific functional group), one having a constitution in which the hydrocarbyloxysilyl group and the specific functional group are present in combination, and one having a constitution in which the hydrocarbyloxysilyl group and/or the specific functional group are separately present.

In the conjugated diene polymer (A), a conjugated diene polymer is a base polymer, into which the hydrocarbyloxysilyl group is introduced, and the specific functional group is introduced if necessary. The hydrocarbyloxysilyl group may be introduced into any one of a molecular end, a molecular side chain and a molecule, and is preferably introduced into a molecular end. Further, the specific functional group may be introduced into any one of a molecular end, a molecular side chain and a molecule.

In the conjugated diene polymer (A), the introduction rate of the hydrocarbyloxysilyl group and the specific functional group to the base polymer, namely, the rate of the polymer into which the hydrocarbyloxysilyl group and the specific functional group have been introduced to the whole base polymer is preferably 30% or more, and more preferably 50% or more.

When the introduction rate of the hydrocarbyloxysilyl group and the specific functional group to the base polymer is excessively small, there is a possibility that sufficient rolling resistance is not obtained in the rubber elastic body obtained from the rubber composition, because of insufficient formation of chemical bonding with the silica (C).

The conjugated diene polymer (hereinafter also referred to as a "base polymer") acting as the base polymer of the conjugated diene polymer (A) has a structural unit derived from a conjugated diene compound, and may contain a structural unit derived from an aromatic vinyl compound, together with the structural unit derived from the conjugated diene compound.

Here, when the base polymer contains the structural unit derived from the aromatic vinyl compound, the contained ratio of the structural units derived from the aromatic vinyl compound is preferably from 10 to 40% by mass.

When the contained ratio of the structural units derived from the aromatic vinyl compound is excessively small, there is a possibility that wear resistance of the rubber elastic body obtained from the rubber composition is decreased. On the other hand, when the contained ratio of the structural units derived from the aromatic vinyl compound is excessively large, there is a possibility that dry grip performance of the rubber elastic body obtained from the rubber composition is decreased.

As the conjugated diene compound for obtaining the structural unit derived from the conjugated diene compound in the base polymer, a straight-chain or branched compound having an aliphatic conjugated double bond is used. When the base polymer contains the structural unit derived from the aromatic vinyl compound, a compound which can be copolymerized with the aromatic vinyl compound is used.

Specifically, for example, 1,3-butadiene, isoprene, 2,3-dimethyl-1,3-butadiene, 1,3-pentadiene, 2,3-dimethylbutadiene, 2-phenyl-1,3-butadiene, 1,3-hexadiene and the like can be suitably used. Further, these may be used either alone or as a combination of two or more thereof.

Of these, 1,3-butadiene, isoprene and 2,3-dimethyl-1,3-butadiene are preferable.

Further, when the base polymer contains the structural unit derived from the aromatic vinyl compound, as the aromatic vinyl compound for obtaining the structural unit derived from, a compound having at least one vinyl group bonded to an aromatic group having a carbon ring or a heterocyclic ring, or a derivative thereof is used.

Specifically, for example, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethylaminoethylenestyrene, 2-t-butylstyrene, 3-t-butylstyrene, 4-t-butylstyrene, vinylpyridine, diphenylethylene, tertiary amino group-containing diphenyl ethylene and the like can be suitably used. Further, these may be used either alone or as a combination of two or more thereof.

Of these, styrene is preferable.

As such a base polymer, one produced by a solution polymerization process is preferable. Further, as the solution polymerization process, a living anion polymerization process is preferable.

It becomes easy to introduce the hydrocarbyloxysilyl group and the specific functional group into the base polymer, by producing the base polymer by the solution polymerization process.

Although various techniques can be used for introduction of the hydrocarbyloxysilyl group and the specific functional group into the base polymer, examples thereof include a technique using, for example, a compound (hereinafter also referred to as a "compound for hydrocarbyloxysilyl group and specific functional group introduction") corresponding to the hydrocarbyloxysilyl group and the specific functional group to be introduced.

The compounds for hydrocarbyloxysilyl group and specific functional group introduction include, for example, tetraethoxysilane, N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis-(triethylsilyl)aminopropylmethyldiethoxysilane, N,N-bis(triethylsilyl)aminopropyldimethylmethoxysilane, N,N-bis(triethylsilyl)aminopropyldimethylethoxysilane, N,N-bis(triethylsilyl)aminoethyltrimethoxysilane, N,N-bis(triethylsilyl)aminoethyltriethoxysilane, N,N-bis(triethylsilyl)aminoethylmethyldimethoxysilane, N,N-bis(triethylsilyl)aminoethylmethyldiethoxysilane, N,N-bis(t-butyldimethylsilyl)aminopropyltrimethoxysilane, N,N-bis(t-butyldimethylsilyl)aminopropyltriethoxysilane, N,N-bis(t-butyldimethylsilyl)aminopropylmethyldimethoxysilane, N,N-bis(t-butyldimethylsilyl)aminopropylmethyldiethoxysilane, N,N-bis(t-butyldimethylsilyl)aminopropyldimethylmethoxysilane, N,N-bis(t-butyldimethylsilyl)aminopropyldimethylethoxysilane, and of these compounds, in a compound in which amino sites are protected with a plurality of trialkylsilyl groups, a compound in which the plurality of trialkylsilyl groups are partially substituted with a methyl group, an ethyl group, a propyl group or a butyl group;

bis[3-(triethoxysilyl)propyl]trimethylsilylamine, bis[3-(trimethoxysilyl)propyl]trimethylsilylamine, 3-dimethylaminopropyltrimethoxysilane, 3-diethylaminopropyltrimethoxysilane, [3-(dimethylamino)propyl]triethoxysilane, [3-(diethylamino)propyl]triethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-diethylaminopropylethyldimethoxysilane, 3-dimethylaminopropyldimethylmethoxysilane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3- ethylaminopropylethyldimethoxysilane, bis-(3-dimethylaminopropyl)-dimethoxysilane, bis-(3-ethylmethylaminopropyl)-diethoxysilane, bis-[(3-dimethylamino-3-methyl)propyl]-dimethoxysilane, bis-[(3-ethylmethylamino-3-methyl)propyl]-dimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, [3-(diethylamino)propyl]trimethoxysilane, [3-(dimethylamino)propyl]triethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxyethyl)aminopropyltrimethoxysilane, 3-di(ethoxymethyl)aminopropyltrimethoxysilane, 3-di(ethoxyethyl)aminopropyltriethoxysilane, 3-di(ethoxymethyl)aminopropyltriethoxysilane, N-(1,3-dimethylbutylidene)-3-(triethoxysilyl)-1-propaneamine, N-(1-methylpropylidene)-3-(triethoxysilyl)-1-propaneamine, N-ethylidene-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, N-(cyclohexylidene)-3-(trimethoxysilyl)-2-propaneamine, N-(cyclohexylidene)-3-(methyldiethoxysilyl)-3-propaneamine and N-(cyclohexylidene)-3-(ethyldimethoxysilyl)-4-propaneamine;

N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilane, and of these compounds, in a compound in which amino sites are protected with a plurality of trialkylsilyl groups, a compound in which the plurality of trialkylsilyl groups are partially substituted with a methyl group, an ethyl group, a propyl group or a butyl group;

N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl))-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, N-[3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)-N'-triethylsilyl-ethane-1,2-diamine, N-[3-(triethoxysilyl)-propyl]-N-ethyl-N-(2-diethylaminoethyl)-N'-triethylsilyl-ethane-1,2-diamine, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N,N',N'-trimethylolpropane-1,3-diamine, N-[3-(dimethoxymethylsilyl)-propyl]-N-ethyl-N',N'-dimethylpropane-1,3-diamine, N-[3-(triethoxysilyl)-propyl]-N,N',N'-triethyl-2-methylpropane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxysilyl)-ethyl]-N,N-dimethylethane-1,2-diamine, N-[2-(diethoxypropylsilyl)-ethyl]-N-(3-ethoxypropyl)-N,N'-dimethylethane-1,2-diamine, N-[2-(trimethoxysilyl)-ethyl]-N'-methoxymethyl-N,N'-dimethylethane-1,2-diamine, N-[2-(trimethoxysilyl)-ethyl]-N,N-dimethyl-N'-(2-trimethylsilylethyl)-ethane-1,2-diamine, N-[2-(triethoxysilyl)-ethyl]-N,N'-diethyl-N'-(2-dibutylmethoxysilylethyl)-ethane-1,2-diamine, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 4-(4-trimethylsilyl-1-piperazinyl)butyltriethoxysilane, 1-[3-(triethoxysilyl)-propyl]-4-methylpiperazine, 1-[3-(diethoxyethylsilyl)-propyl]-4-methylpiperazine, 2-(triethoxysilyl)-1,4-diethylpiperazine, 2-(dimethoxymethylsilyl)-1,4-dimethylpiperazine, 2-(3-triethoxysilyl-propyl)-1,4-diethylpiperazine, 2-(3-dimethoxymethylsilyl-propyl)-1,4-dimethylpiperazine, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, 3-(3-trimethylsilyl-1-imidazolidinyl)propylethyldiethoxysilane, 3-(3-trimethylsilyl-1-imidazolidinyl)propyltriethoxysilane, 1-[3-(trimethoxysilyl)-propyl]-3-methylimidazolidine, 1-[3-(diethoxyethylsilyl)-propyl]-3-ethylimidazolidine, 1-(2-ethoxyethyl)-3[3-(trimethoxysilyl)-propyl]imidazolidine, 2-(trimethoxysilyl)-1,3-dimethylimidazolidine, 2-(3-trimethoxysilyl-propyl)-1,3-dimethylimidazolidine, 2-(diethoxysilylethyl)-1,3-diethylimidazolidine, 2-[3-(2-dimethylaminoethyl)-2-(ethyldimethoxysilyl)-imidazolidine-1-yl]-ethyl-dimethylamine, 2-(3-diethoxyethylsilyl-propyl)-1,3-diethylimidazolidine, 2-[3-(2-dimethylaminoethyl)-2-(3-ethyldimethoxysilyl-propyl)-imidazolidine-1-yl]-ethyl-dimethylamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-(3-trimethylsilyl-1-hexahydropyrimidinyl)propylmethyldimethoxysilane, 3-(3-trimethylsilyl-1-hexahydropyrimidinyl)propyltriethoxysilane, 1-[3-(triethoxysilyl)propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 2-{3-[3-(trimethoxysilyl)-propyl]-tetrahydropyrimidine-1-yl}-ethyldimethylamine, 5-(triethoxysilyl)-1,3-dipropylhexahydropyrimidine, 5-(diethoxyethylsilyl)-1,3-diethylhexahydropyrimidin, 5-(trimethoxysilyl)-1,3-bis-(2-methoxyethyl)-hexahydropyrimidine, 5-(ethyldimethoxysilanyl)-1,3-bis-trimethylsilanylhexahydropyrimidine, 5-(3-triethoxysilyl-propyl)-1,3-dipropylhexahydropyrimidine, 5-(3-diethoxysilylethyl-propyl)-1,3-diethylhexahydropyrimidine, 5-(3-trimethoxysilyl-propyl)-

1,3-bis-(2-methoxyethyl)-hexahydropyrimidine, 5-(3-ethyldimethoxysilyl-propyl)-1,3-bis-(2-trimethylsilylethyl)-hexahydropyrimidine, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, 3-di(t-butyldimethylsilyl)aminopropyltrimethoxysilane, 3-di(t-butyldimethylsilyl)aminopropyltriethoxysilane, 3-di(t-butyldimethylsilyl)aminopropylmethyldimethoxysilane, 3-di(t-butyldimethylsilyl)aminopropylmethyldiethoxysilane, 3-di(t-butyldimethylsilyl)aminopropyldimethylmethoxysilane, 3-di(t-butyldimethylsilyl)aminopropyldimethylethoxysilane, N-(1,3-dimethylbutylidene)-3-(trimethoxysilyl)-1-propaneamine, N-(cyclohexylidene)-3-(trimethoxysilyl)-1-propaneamine, N-(cyclohexylidene)-3-(methyldiethoxysilyl)-1-propaneamine, N-(cyclohexylidene)-3-(ethyldimethoxysilyl)-1-propaneamine, [(3-methyl-3-ethylamino)propyl]trimethoxysilane, [(3-methyl-3-ethylamino)propyl]triethoxysilane, P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 1-(4-N,N-dimethylaminophenyl)-1-phenylethylene, 1-(4-N,N-diethylaminophenyl)-1-phenylethylene, 1-(4-N,N-dipropylaminophenyl)-1-phenylethylene, 1-(4-N,N-dibutylaminophenyl)-1-phenylethylene, 1-(4-N,N-dimethoxyaminophenyl)-1-phenylethylene, 1-(4-N,N-diethoxyaminophenyl)-1-phenylethylene, 1-(4-N,N-dipropoxyaminophenyl)-1-phenylethylene, 1-(4-N,N-dibutoxyaminophenyl)-1-phenylethylene, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinopropyldimethylethoxysilane, 3-diethylphosphinopropyldiethylethoxysilane, 3-ethylmethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmeryldimethoxysilane, 3-diphenylphosphinopropylmeryldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane and S-trimethylsilylmercaptoethylmethyldiethoxysilane.

Of these, N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris-(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, [3-(dimethylamino)propyl]triethoxysilane, [3-(diethylamino)propyl]triethoxysilane, bis[3-(triethoxysilyl)propyl]trimethylsilylamine, bis[3-(trimethoxysilyl)propyl]-trimethylsilylamine, N-(1,3-dimethylbutylidene)-3-(triethoxysilyl)-1-propaneamine, N-(1-methylpropylidene)-3-(triethoxysilyl)-1-propaneamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, bis(3-dimethylaminopropyl)-dimethoxysilane, [3-(diethylamino)propyl]trimethoxysilane, [3-(dimethylamino)propyl]triethoxysilane, 3-diphenylphosphinopropyltrimethoxysilane, 3-diphenylphosphinepropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane and 1-(4-N,N-dimethylaminophenyl)-1-phenylethylene are preferable.

Further, with respect to a compound containing a trimethylsilyl group of the above-mentioned compounds for hydrocarbyloxysilyl group and specific functional group introduction, a part or the whole of the trimethylsilyl groups may be substituted with hydrogen in the resulting hydrocarbyloxysilyl group. Furthermore, of the hydrogen-substituted ones, with respect to a group (hereinafter also referred to as an "onium-forming group") that can form an onium by an action of an onium-forming agent, an onium salt structure may be formed. The onium-forming groups include, for example, nitrogen-containing functional groups represented by an amino group, phosphorus-containing groups represented by a phosphino group, sulfur-containing groups represented by a thiol group, and the like.

Here, as the onium-forming agents, there are used, for example, metal halides such as silicon halide compounds, tin halide compounds, aluminum halide compounds, titanium halide compounds, zirconium halide compounds, germanium halide compounds, zinc halide compounds and gallium halide compounds, sulfuric acid esters, phosphoric acid esters, carbonic acid esters, nitric acid esters, inorganic acids such as hydrofluoric acid, hydrochloric acid, hydrobromic acid, hydroiodic acid, sulfuric acid, nitric acid, carbonic acid and phosphoric acid, inorganic acid salts such as potassium fluoride, tetramethylammonium fluoride, tetra-n-butylammonium fluoride, organic acids such as carboxylic acids and sulfonic acids, and the like.

Specific examples of the onium-forming agents include silicon tetrachloride, tin tetrachloride, trimethylsilyl chloride, dimethyldichlorosilane, methyltrichlorosilane, methyldichlorosilane, diethylaluminum chloride, ethylaluminum sesquichloride, ethylaluminum dichloride, titanium tetrachloride and titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerine, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, tetra-n-butylammonium fluoride and the like.

From the viewpoint of cold flowing properties of the rubber elastic body obtained from the rubber composition, the conjugated diene polymer (A) may be one coupled with a coupling multifunctional compound (multifunctional modifier).

A coupling reaction in which the conjugated diene polymer (A) is coupled with the coupling multifunctional compound may be conducted either before or after introduction of the hydrocarbyloxysilyl group into the base polymer, or may be performed at the same time of the introduction of the hydrocarbyloxysilyl group.

The coupling multifunctional compounds include at least one compound selected from the group consisting of (a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound and (g) a tin compound.

Suitable examples of the isocyanate compounds of the above-mentioned (a) include 2,4-tolylene diisocyanate, 2,6-tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate and the like.

Further, suitable examples of the isothiocyanate compounds of the above-mentioned (a) include phenyl-1,4-diisothiocyanate and the like.

Suitable examples of the amide compounds of the above-mentioned (b) include succinamide, phthalamide, N,N,N',N'-tetramethylphthalamide, oxamide, N,N,N',N'-tetramethyloxamide and the like.

Further, suitable examples of the imide compounds of the above-mentioned (b) include succinimide, N-methylsuccinimide, maleimide, N-methylmaleimide, phthalimide, N-methylphthalimide and the like.

Suitable examples of the pyridyl-substituted ketone compounds of the above-mentioned (c) include dibenzoylpyridine, diacetylpyridine and the like.

Further, suitable examples of the pyridyl-substituted vinyl compounds of the above-mentioned (c) include divinylpyridine and the like.

Suitable examples of the silicon compounds of the above-mentioned (d) include dibutyldichlorosilicon, methyltrichlorosilicon, methyldichlorosilicon, tetrachlorosilicon, triethoxymethylsilane, triphenoxymethylsilane, trimethoxysilane, methyltriethoxysilane, 4,5-epoxyheptylmethyldimethoxysilane, bis(triethoxysilylpropyl)tetrasulfide and the like.

Suitable examples of the ester compounds of the above-mentioned (e) include diethyl adipate, diethyl malonate, diethyl phthalate, diethyl glutarate, diethyl maleate and the like.

Suitable examples of the ketone compounds of the above-mentioned (f) include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, tetramethyl-1,4-diaminoanthraquinone and the like.

Suitable examples of the tin compounds of the above-mentioned (g) include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like.

These compounds may be used either alone or as a combination of two or more thereof.

In such a conjugated diene polymer (A), the content of 1,2-vinyl bonds in the structural unit derived from the conjugated diene compound is preferably from 30 to 70 mol %.

When the content of 1,2-vinyl bonds is excessively small, there is a possibility that a balance between wet grip performance and rolling resistance in the rubber elastic body obtained from the rubber composition is deteriorated.

On the other hand, when the content of 1,2-vinyl bonds is excessively large, there is a possibility that wear resistance of the rubber elastic body obtained from the rubber composition is extremely decreased.

Here, the content of 1,2-vinyl bonds in the structural unit derived from the conjugated diene compound can be calculated from a 500 MHz $^1$H-NMR spectrum.

The contained ratio of the conjugated diene polymer (A) is from 30 to 95% by mass, preferably from 40 to 90% by mass, and more preferably from 50 to 85% by mass, in the rubber composition.

When the contained ratio of the conjugated diene polymer (A) is excessively small, there is a possibility that rolling resistance of the rubber elastic body obtained from the rubber composition is increased. On the other hand, when the contained ratio of the conjugated diene polymer (A) is excessively large, there is a possibility that excellent impact resilience is not obtained in the rubber elastic body obtained from the rubber composition.

[Cross-linked Rubber Particles (B)]

The cross-linked rubber particles (B) are rubber particles composed of a cross-linked rubber.

The cross-linked rubber that constitutes the cross-linked rubber particles (B) is one comprising at least one polymer selected from a rubber polymer (hereinafter also referred to as a "specific rubber polymer") selected from the group consisting of isoprene rubber, butadiene rubber, styrene-butadiene copolymerized rubber, styrene-isoprene copolymerized rubber, butadiene-isoprene copolymerized rubber, styrene-butadiene-isoprene copolymerized rubber, styrene-acrylonitrile-butadiene copolymerized rubber, acrylonitrile-butadiene copolymerized rubber, ethylene-α-olefin copolymerized rubber, ethylene-α-olefindiene copolymerized rubber, chloroprene rubber, halogenated butyl rubber and polysiloxane rubber, and a graft polymer (hereinafter also referred to as a "specific rubber graft polymer") obtained by graft polymerizing a conjugated diene compound (hereinafter also referred to as a "conjugated diene monomer") and/or a styrene compound (hereinafter also referred to as a "styrene monomer") to this specific rubber polymer.

The specific rubber graft polymers include graft polymers in which the conjugated diene monomers are graft polymerized, graft polymers in which the styrene monomers are graft polymerized and graft polymers in which the conjugated diene monomers and the styrene monomers are graft polymerized.

As the cross-linked rubber that constitutes the cross-linked rubber particles (B), butadiene rubber and styrene-butadiene copolymerized rubber, from the viewpoint of compounding processability are preferable.

Further, in the cross-linked rubber particles (B), the average particle size thereof is preferably from 10 to 800 nm, and particularly preferably from 30 to 700 nm.

Here, the average particle size of the cross-linked rubber particles (B) is measured by a light scattering method.

When the average particle size of the cross-linked rubber particles (B) is excessively large, there is a possibility that wear resistance of the rubber elastic body obtained from the rubber composition is decreased. On the other hand, when the average particle size of the cross-linked rubber particles (B) is excessively small, there is a possibility that impact resilience of the rubber elastic body obtained from the rubber composition is decreased.

Such cross-linked rubber particles (B) can be produced by an emulsion polymerization process or a suspension polymerization process.

Specifically, when the cross-linked rubber particles (B) are composed of the specific rubber polymer, a monomer (hereinafter also referred to as a "rubber particle-forming monomer") for obtaining the specific rubber polymer is polymerized in a medium, with using a polymerization initiator, an emulsifier and a suspension stabilizer if necessary, by which the rubber particles composed of the specific rubber polymer can be obtained.

Further, when the cross-linked rubber particles (B) are composed of the specific graft polymer, the conjugated diene monomer and/or the styrene monomer is graft polymerized to the specific rubber polymer obtained by the emulsion polymerization process or the suspension polymerization process, by which the rubber particles composed of the graft polymer can be obtained.

As the rubber particle-forming monomer, an appropriate compound is used depending on the kind of polymer to be formed. However, in order to form a cross-linked structure, for example, a multifunctional compound containing a polymerizable unsaturated group (hereinafter also referred to as a "cross-linked structure-forming compound") is used.

The compounds for cross-linked structure formation include divinylbenzene, diallyl phthalate, ethylene glycol di(meth)acrylate, diethylene glycol di(meth)acrylate, propylene glycol di(meth)acrylate, propanediol di(meth)acrylate, butanediol di(meth)acrylate, hexanediol di(meth)acrylate, trimethylolpropane di(meth)acrylate, trimethylolpropane tri(meth)acrylate, pentaerythritol tri(meth)acrylate, pentaerythritol tetra(meth)acrylate, hydroquinone, polyethylene glycol di(meth)acrylate, polypropylene glycol di(meth)acrylate and the like.

Of these, divinylbenzene and trimethylolpropane tri(meth)acrylate, are preferable from the viewpoint of versatility, namely cost reduction.

The ratio of the cross-linked structure-forming compound to the rubber particle-forming monomer is preferably from 0.5 to 5 parts by mass based on a total of 100 parts by mass of the monomer (rubber particle-forming monomer) to be subjected to polymerization.

When the ratio of the cross-linked structure-forming compound is excessively small and excessively large, there is a possibility that impact resilience of the rubber elastic body obtained from the rubber composition is decreased, in each case.

Further, for the purpose of improving dispersibility of the cross-linked rubber particles (B) in the rubber composition, a functional group-containing compound (hereinafter also referred to as a "dispersibility improving material") may be used as the rubber particle-forming monomer. Namely, the cross-linked rubber particles (B) may have a structural unit derived from the functional group-containing compound.

Specific examples of the dispersibility improving compounds include hydroxyethyl methacrylate, hydroxypropyl methacrylate, hydroxybutyl methacrylate, ethylene glycol dimethacrylate, trimethylolpropane trimethacrylate, pentaerythritol tetramethacrylate, tert-butoxydimethylsilylstyrene, isopropoxydimethylsilylstyrene and the like.

Of these, hydroxyethyl methacrylate, from the viewpoint of rolling resistance in the rubber elastic body obtained from the rubber composition is preferable.

In this connection, ethylene glycol dimethacrylate, trimethylolpropane trimethacrylate and pentaerythritol tetramethacrylate have also an action as the cross-linked structure-forming compound.

The ratio of the dispersibility improving compound to the rubber particle-forming monomer is preferably from 0.5 to 10 parts by mass based on a total of 100 parts by mass of the monomer (rubber particle-forming monomer) to be subjected to polymerization.

When the ratio of the dispersibility improving compound is excessively small, there is a possibility that rolling resistance of the rubber elastic body obtained from the rubber composition is decreased. On the other hand, when the ratio of the dispersibility improving compound is excessively large, there is a possibility that impact resilience of the rubber elastic body obtained from the rubber composition is decreased.

In the emulsion polymerization process, a radical polymerization initiator is used as the polymerization initiator. As the radical polymerization initiators, for example, organic peroxides such as benzoyl peroxide, lauroyl peroxide, tert-butyl hydroperoxide, cumene hydroperoxide, p-menthane hydroperoxide, di-tert-butyl peroxide and dicumyl peroxide can be used. In addition, diazo compounds such as adobisisobutyronitrile, inorganic peroxides such as potassium persulfate, redox catalysts such as combinations of these peroxides and ferrous sulfate, and the like can be used.

Further, in the emulsion polymerization process, chain transfer agents, for example, mercaptans such as tert-dodecylmercaptan and n-dodecylmercaptan, carbon tetrachloride, thioglycols, deterpene, terpinolenes and γ-terpinenes, together with the polymerization initiators can be also used.

As the emulsifiers used in the emulsion polymerization process, anionic surfactants, nonionic surfactants, cationic surfactants, amphoteric surface active agent and the like can be used. In addition, fluorine-based surfactants can also be used. The emulsifiers may be used either alone or as a combination of two or more thereof.

The suspension stabilizers used in the suspension polymerization process include polyvinyl alcohol, sodium polyacrylate, hydroxyethyl cellulose and the like. The suspension stabilizers may be used either alone or as a combination of two or more thereof.

The contained ratio of the cross-linked rubber particles (B) is from 5 to 70% by mass, preferably from 6 to 50% by mass, and more preferably from 7 to 40% by mass, in the rubber composition.

When the contained ratio of the cross-linked rubber particles (B) is excessively small and excessively large, there is a possibility that impact resilience of the rubber elastic body obtained from the rubber composition is decreased, in each case.

In the rubber component, in addition to the conjugated diene polymer (A) and the cross-linked rubber particles (B) as essential ingredients, another known rubber component usable in a rubber composition for a tire, for example, natural rubber, butadiene rubber, butyl rubber, synthetic isoprene rubber, styrene-butadiene copolymerized rubber, ethylene-α-olefin copolymerized rubber, ethylene-α-olefin-diene copolymerized rubber, acrylonitrile-butadiene copolymerized rubber, chloroprene rubber or halogenated butyl rubber, or a mixture thereof may be contained as an optional ingredient. Of these, it is preferred to contain natural rubber or butadiene rubber, for the reason that a balance between wet grip performance and rolling resistance can be highly achieved with maintaining wear resistance, in the rubber elastic body obtained from the rubber composition.

The contained ratio of the optional ingredient in the rubber component is preferably from 10 to 45% by mass based on 100% by mass of the rubber component.

(Silica (C))

As silica (C), silica generally used as a filler can be used. However, synthetic silicic acid having a primary particle size of 50 nm or less is preferred from the viewpoint of rolling resistance and impact resilience of the rubber elastic body obtained from the rubber composition.

The contained ratio of the silica (C) is from 20 to 100 parts by mass based on 100 parts by mass of the rubber component.

When the contained ratio of the silica (C) is excessively small and excessively small, there is a possibility that a balance between hardness and rolling resistance is deteriorated in the rubber elastic body obtained from the rubber composition, in each case.

In the rubber composition of the present invention, optional ingredients may be contained as needed, in addition to the conjugated diene polymer (A), the cross-linked rubber particles (B) and the silica (C) as essential ingredients.

Specific examples of the optional ingredients include, for example, reinforcing agents such as carbon black, softening agents such as oil, silane coupling agents, waxes, antioxidants, stearic acid, zinc oxide, vulcanizing agents or crosslinking agents such as sulfur, vulcanization accelerators and the like, in addition to the above-mentioned optional ingredients with respect to the rubber component.

The rubber composition of the present invention as described above is an unvulcanized rubber composition, and the rubber elastic body is formed, for example, by a crosslinking treatment such as vulcanization. The silica (C) is blended together with the rubber component, and further, the cross-linked rubber particles (B) are contained as the rubber component at a specific ratio together with the conjugated diene polymer (A). Accordingly, dispersibility of the silica (C) is increased by an action of the conjugated diene polymer (A), and moreover, the silica (C) is rejected by the cross-linked rubber particles (B), which results in partial uneven distribution of the silica (C). An excessive increase in dispersibility of the silica (C) is suppressed by such an action of the cross-linked rubber particles (B), so that dispersibility of the silica (C) is improved from the viewpoint of a balance between rolling resistance and impact resilience in the rubber elastic body obtained from the rubber composition.

According to the rubber composition of the present invention, therefore, the elastic body having small rolling resistance and excellent impact resilience can be obtained.

Such a rubber composition of the present invention can be produced by kneading the optional ingredients as needed, together with the conjugated diene polymer (A), the cross-linked rubber particles (B) and the silica (C) as the essential ingredients, for example, with using a plastomill.

A method for producing a rubber composition of the present invention is characterized by kneading a rubber component containing 30 to 95% by mass of a conjugated diene polymer (A) containing a hydrocarbyloxysilyl group and 5 to 70% by mass of cross-linked rubber particles (B) with 20 to 100 parts by mass of silica (C) based on 100 parts by mass of the rubber component. In this kneading, the respective elements constituting the rubber composition to be produced, specifically, the conjugated diene polymer (A), the cross-linked rubber particles (B) and the silica (C) as the essential ingredients and the optional ingredients as needed are not limited to be blended at the same time. For example, the respective elements may be sequentially blended.

Further, the rubber elastic body obtained from the rubber composition according to the present invention is suitably used as a tire (specifically, a tread of a tire).

In such a tire having the tread obtained from the rubber composition according to the present invention, namely, in the tire of the present invention, rolling resistance is small, and excellent impact resilience is obtained.

Here, the tire of the present invention is produced by a usual method with using the rubber composition of the present invention.

Namely, for example, the rubber composition (unvulcanized rubber composition) of the present invention is extruded according to the shape of the tire to be molded (specifically, the shape of the tread) to perform molding on a tire molding machine by a usual method, thereby forming an uncross-linked (unvulcanized) tire. This uncross-linked (unvulcanized) tire is heated and pressurized in a vulcanizing machine, by which the tire composed of the rubber composition according to the present invention is produced.

EXAMPLES

Although specific examples of the present invention will be described below, the present invention is not construed as being limited to these examples.

In the following examples and comparative examples, measuring methods of various physical property values are as follows:

(1) The contained ratio (hereinafter also referred to as the "bonded styrene content") of structural units derived from styrene as an aromatic vinyl compound in the conjugated diene polymer:

Calculated from the 500 MHz, $^1$H-NMR spectrum with using deuterated chloroform as a solvent.

(2) The content (hereinafter also referred to as the "vinyl bond content") of 1,2-vinyl bonds in a structural unit derived from a conjugated diene compound in the conjugated diene polymer:

Calculated from the 500 MHz, $^1$H-NMR spectrum.

(3) Glass Transition Temperature (Tg) in Conjugated Diene Polymer:

Measured by differential scanning calorimetry (DSC) in accordance with ASTM D3418.

(4) Molecular Weight of Base Polymer Involved in Conjugated Diene Polymer:

Measurement was carried out by gel permeation chromatography (GPC), "HLC-8120GPC" (manufactured by Tosoh Corporation) under the following conditions, and the polystyrene-converted weight average molecular weight (Mw) was determined from the retention time corresponding to the maximum peak height of a GPC curve obtained.

(GPC Conditions)

Column: Trade name "GMHHXL" (manufactured by Tosoh Corporation), 2 columns

Column temperature: 40° C.

Mobile phase: Tetrahydrofuran

Flow rate: 1.0 ml/min

Sample concentration: 10 mg/20 ml (5) Mooney Viscosity in Conjugated Diene Polymer and Rubber Composition:

Measured in accordance with JIS K6300 with using an L-rotor under conditions of preheating for 1 minute, rotor operation for 4 minutes and a temperature of 100° C.

(6) Average Particle Size of Cross-linked Rubber Particles:

Measured by a light scattering method.

Synthesis Example 1 of Conjugated Diene Polymer

Firstly, an autoclave reactor having an internal volume of 5 liters in which the atmosphere was replaced with nitrogen was charged with 2,750 g of cyclohexane as a solvent, 50 g of tetrahydrofuran as an adjuster for adjusting the vinyl bond content, and 125 g of styrene and 375 g of 1,3-butadiene as monomers. After the temperature in the reactor was adjusted to 10° C., a cyclohexane solution containing 5.8 mmol of n-butyllithium as a polymerization initiator was added thereto to initiate polymerization. The polymerization was conducted under adiabatic conditions, and the maximum temperature reached 85° C.

After confirmation that the polymerization conversion reached 99%, the polymerization was further conducted for 5 minutes from the time when the polymerization conversion reached 99%. Thereafter, 10 g was sampled from a reaction solution obtained, namely a polymer solution containing a copolymer (base polymer) composed of a conjugated diene compound (1,3-butadiene) and an aromatic vinyl compound (styrene), for measurement of the molecular weight (for measurement of the molecular weight of the base polymer).

Then, a cyclohexane solution containing 4.96 mmol of N,N-bis(trimethylsilyl)aminopropylmethyldiethoxysilane was added as a functional group-introducing agent (compound for hydrocarbyloxysilyl group and specific functional group introduction) to the polymer solution after sampling, followed by reaction for 15 minutes. Thereafter, 2 g of 2,6-di-tert-butyl-p-cresol was added to a polymer solution obtained, and further, a desolvation treatment was performed by steam stripping with using hot water adjusted to pH 9 with sodium hydroxide. Then, a drying treatment was performed with a hot roll controlled to 110° C. to obtain a conjugated diene polymer containing a hydrocarbyloxysilyl group and primary amino group (hereinafter also referred to as "conjugated diene polymer (A1) introduce by a functional group(s)").

For the resulting conjugated diene polymer (A1) introduce by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 2 of Conjugated Diene Polymer

A conjugated diene polymer containing a hydrocarbyloxysilyl group and tertiary amino group (hereinafter also referred to as "conjugated diene polymer (A2) introduced by a functional group(s)") was obtained by the same technique as in Synthesis Example 1 of conjugated diene polymer with the exception that 4.96 mmol of 1[3-(triethoxysilye-propyl]-4-methylpiperazine was used in place of 4.96 mmol of N,N-bis(trimethylsilyl)aminopropylmethyldiethoxysilane.

For the resulting conjugated diene polymer (A2) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 3 of Conjugated Diene Polymer

A conjugated diene polymer containing a hydrocarbyloxysilyl group and secondary amino group (hereinafter also referred to as "conjugated diene polymer (A3) introduced by a functional group(s)") was obtained by the same technique as in Synthesis Example 1 of conjugated diene polymer with the exception that 4.96 mmol of 3-(4-trimethylsilyl-1-piperazino)propyltriethoxysilane was used in place of 4.96 mmol of N,N-bis(trimethylsilyl)aminopropylmethyldiethoxysilane.

For the resulting conjugated diene polymer (A3) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 4 of Conjugated Diene Polymer

A conjugated diene polymer containing a hydrocarbyloxysilyl group and a secondary amino group (hereinafter also referred to as "conjugated diene polymer (A4) introduced by a functional group(s)") was obtained by the same technique as in Synthesis Example 1 of conjugated diene polymer with the exception that 4.96 mmol of N,N',N'-tris(trimethylsilyl)-N-(2-aminoethyl)-3-aminopropyltriethoxysilane was used in place of 4.96 mmol of N,N-bis(trimethylsilyl)aminopropylmethyldiethoxysilane.

For the resulting conjugated diene polymer (A4) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 5 of Conjugated Diene Polymer

A conjugated diene polymer containing a hydrocarbyloxysilyl group and tertiary amino group (hereinafter also referred to as "conjugated diene polymer (A5) introduced by a functional group(s)") was obtained by the same technique as in Synthesis Example 1 of conjugated diene polymer with the exception that 4.96 mmol of [3-(dimethylamino)propyl]triethoxysilane was used in place of 4.96 mmol of N,N-bis(trimethylsilyl)aminopropylmethyldiethoxysilane.

For the resulting conjugated diene polymer (A5) introduced by a functional group(s), the bonded styrene content, vinyl bond content, glass transition temperature and Mooney viscosity were measured. The results thereof are shown in Table 2, together with the weight average molecular weight of the polymer before the hydrocarbyloxysilyl group and specific functional group introduction, namely the weight average molecular weight of the base polymer.

Synthesis Example 6 of Conjugated Diene Polymer

A conjugated diene polymer containing a hydrocarbyloxysilyl group and thiol group (hereinafter also referred to as "conjugated diene polymer (A6) introduced by a functional group(s)") was obtained by the same technique as in Synthesis Example 1 of Conjugated diene polymer with the exception that 4.96 mmol of S-trimethylsilylmercaptopropylmethyldiethoxysilane was used in place of 4.96 mmol of N,N-bis(trimethylsilyl)aminopropylmethyldiethoxysilane.

For the resulting conjugated diene polymer (A6) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 7 of Conjugated Diene Polymer

A conjugated diene polymer containing a hydrocarbyloxysilyl group and primary amino group (hereinafter also referred to as "conjugated diene polymer (A7) introduced by a functional group(s)") was obtained by the same technique as in Synthesis Example 1 of conjugated diene polymer with the exception that 125 g of styrene and 375 g of 1,3-butadiene were used as monomers; that 5 g of 1-(4-N,N-dimethylaminophenyl)-1-phenylethylene was used as a monomer for modification; and that 4.96 mmol of tetraethoxysilane was used in place of 4.96 mmol of N,N-bis(trimethylsilyl)aminopropylmethyldiethoxysilane.

For the resulting conjugated diene polymer (A7) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 8 of Conjugated Diene Polymer

A mixture (hereinafter also referred to as "a conjugated diene polymer (A8) introduced by a functional group(s)") of a conjugated diene polymer containing hydrocarbyloxysilyl group and primary amino group and a conjugated diene polymer containing a hydrocarbyloxysilyl group and a secondary amino group was obtained by the same technique as in Synthesis Example 1 of conjugated diene polymer with the exception that 4.96 mmol of N-(1,3-dimethylbutylidene)-3-(triethoxysilyl)-1-propaneamine was used in place of 4.96 mmol of N,N-bis(trimethylsilyl)aminopropylmethyldiethoxysilane.

For the resulting a conjugated diene polymer (A8) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 9 of Conjugated Diene Polymer

A conjugated diene polymer containing a hydrocarbyloxysilyl group and primary amino group (hereinafter also referred to as "conjugated diene polymer (A9) introduced by a functional group(s)") was obtained by the same technique as in Synthesis Example 1 of conjugated diene polymer with the exceptions that 4.96 mmol of tetraethoxysilane and 4.96 mmol of N-(3-triethoxysilylpropyl)-4,5-dihydroimidazole were used in place of 4.96 mmol of N,N-bis(trimethylsilyl)aminopropylmethyldiethoxysilane and that tetraethoxysilane and N-(3-triethoxysilylpropyl)-4,5-dihydroimidazole were added in this order.

For the resulting conjugated diene polymer (A9) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 10 of Conjugated Diene Polymer

A conjugated diene polymer containing a hydrocarbyloxysilyl group and primary amino group wherein an onium salt structure was formed (hereinafter also referred to as "conjugated diene polymer (A10) introduced by a functional group(s)") was obtained by the same technique as in Synthesis Example 1 of conjugated diene polymer with the exception that a cyclohexane solution containing 2.69 mmol of silicon tetrachloride was added before addition of 2,6-di-tert-butyl-p-cresol, followed by mixing for 5 minutes.

For the resulting conjugated diene polymer (A10) introduced by a functional group(s), the bonded styrene content, vinyl bond content, glass transition temperature and Mooney viscosity were measured. The results thereof are shown in Table 2, together with the weight average molecular weight of the polymer before introduction of the hydrocarbyloxysilyl group and specific functional group, namely the weight average molecular weight of the base polymer.

Synthesis Example 11 of Conjugated Diene Polymer

A conjugated diene polymer (hereinafter also referred to as "conjugated diene polymer (A11) introduced by a functional group(s)") was obtained by the same technique as in Synthesis Example 1 of conjugated diene polymer with the exception that 4.96 mmol of methanol was used in place of 4.96 mmol of N,N-bis(trimethylsilyl)aminopropylmethyldiethoxysilane.

For the resulting conjugated diene polymer (A11) introduced by a functional group(s), the bonded styrene content, vinyl bond content, glass transition temperature and Mooney viscosity were measured. The results thereof are shown in Table 2, together with the weight average molecular weight of the polymer before addition of methanol, namely the weight average molecular weight of the base polymer.

Synthesis Example 12 of Conjugated Diene Polymer

A conjugated diene polymer (hereinafter also referred to as "conjugated diene polymer (A12) introduced by a functional group(s)") was obtained by the same technique as in Synthesis Example 1 of conjugated diene polymer with the exception that 4.96 mmol of methanol was used in place of 4.96 mmol of N,N-bis(trimethylsilyl)aminopropylmethyldiethoxysilane and that 6.25 g of 3-mercaptopropionic acid and 0.5 g of dilauroyl peroxide were added before addition of 2 g of 2,6-di-tert-butyl-p-cresol, followed by mixing under a temperature condition of 80° C. for 2.5 hours.

For the resulting conjugated diene polymer (A12) introduced by a functional group(s), the bonded styrene content, vinyl bond content, glass transition temperature and Mooney viscosity were measured. The results thereof are shown in Table 2, together with the weight average molecular weight of the polymer before addition of methanol, namely the weight average molecular weight of the base polymer.

TABLE 1

| | | Conjugated Diene Polymer Number Introduced by a Functional Group(s) | | | | | | | | | | | |
|---|---|---|---|---|---|---|---|---|---|---|---|---|---|
| | | A1 | A2 | A3 | A4 | A5 | A6 | A7 | A8 | A9 | A10 | A11 | A12 |
| Solvent (g) | Cyclohexane | 2750 | 2750 | 2750 | 2750 | 2750 | 2750 | 2750 | 2750 | 2750 | 2750 | 2750 | 2750 |
| Vinyl Bond Content Adjuster (g) | Tetrahydrofuran | 50 | 50 | 50 | 50 | 50 | 50 | 50 | 50 | 50 | 50 | 50 | 50 |
| Monomer (g) | Styrene | 125 | 125 | 125 | 125 | 125 | 125 | 125 | 125 | 125 | 125 | 125 | 125 |
| | 1,3-Butadiene | 375 | 375 | 375 | 375 | 375 | 375 | 375 | 375 | 375 | 375 | 375 | 375 |
| | Monomer for Modification | — | — | — | — | — | — | 5 | — | — | — | — | — |
| Polymerization Initiator (mmol) | n-Butyllithium | 5.8 | 5.8 | 5.8 | 5.8 | 5.8 | 5.8 | 5.8 | 5.8 | 5.8 | 5.8 | 5.8 | 5.8 |
| Functional Group - Introducing Agent (mmol) | Carbyloxysilane Compound (1) | 4.96 | — | — | — | — | — | — | — | — | — | 4.96 | — |
| | Carbyloxysilane Compound (2) | — | 4.96 | — | — | — | — | — | — | — | — | — | — |
| | Carbyloxysilane Compound (3) | — | — | 4.96 | — | — | — | — | — | — | — | — | — |
| | Carbyloxysilane Compound (4) | — | — | — | 4.96 | — | — | — | — | — | — | — | — |
| | Carbyloxysilane Compound (5) | — | — | — | — | 4.96 | — | — | — | — | — | — | — |
| | Carbyloxysilane Compound (6) | — | — | — | — | — | 4.96 | — | — | — | — | — | — |
| | Carbyloxysilane Compound (7) | — | — | — | — | — | — | — | 4.96 | — | 4.96 | — | — |
| | Carbyloxysilane Compound (8) | — | — | — | — | — | — | — | — | 4.96 | — | — | — |
| | Carbyloxysilane Compound (9) | — | — | — | — | — | — | — | — | — | 4.96 | — | — |
| | Methanol | — | — | — | — | — | — | — | — | — | — | 4.96 | 4.96 |
| Onium-Forming Agent (mmol) | Silicon Tetrachloride | — | — | — | — | — | — | — | — | — | 2.69 | — | — |
| | 3-Mercaptopropionic Acid (g) | — | — | — | — | — | — | — | — | — | — | — | 6.25 |
| | Dilauroyl Peroxide (g) | — | — | — | — | — | — | — | — | — | — | — | 0.5 |

In Table 1, the "monomer for modification" is 1-(4-N,N-dimethylaminophenyl)-1-phenylethylene, the "carbyloxysilane compound (1)" is N,N-bis(trimethylsilyl)aminopropylmethyldiethoxysilane; the "carbyloxysilane compound (2)" is 1-[3-(triethoxysilyl)-propyl]-4-methylpiperazine; the "carbyloxysilane compound (3)" is 3-(4-trimethylsilyl-1-piperazino)propyltriethoxysilane; the "carbyloxysilane compound (4)" is N,N',N'-tris(trimethylsilyl)-N-(2-aminoethyl)-3-aminopropyltriethoxysilane; the "carbyloxysilane compound (5)" is [3-(dimethylamino)propyl]triethoxysilane; the "carbyloxysilane compound (6)" is S-trimethylsilylmercaptopropylmethyldiethoxysilane; the "carbyloxysilane compound (7)" is tetraethoxysilane; the "carbyloxysilane compound (8)" is N-(1,3-dimethylbutylidene)-3-(triethoxysilyl)-1-propaneamine; and the "carbyloxysilane compound (9)" is N-(3-triethoxysilylpropyl)-4,5-dihydroimidazole.

TABLE 2

| | Conjugated Diene polymer Number Introduced by a Functional Group(s) | | | | | | | | | | | |
|---|---|---|---|---|---|---|---|---|---|---|---|---|
| | A1 | A2 | A3 | A4 | A5 | A6 | A7 | A8 | A9 | A10 | A11 | A12 |
| Bonded Styrene Content (% by mass) | 25 | 25 | 25 | 25 | 25 | 25 | 24 | 25 | 25 | 25 | 25 | 25 |
| Vinyl Bond Content (mol %) | 56 | 55 | 55 | 54 | 56 | 55 | 53 | 54 | 54 | 56 | 55 | 50 |
| Glass Transition Temperature (° C.) | −30 | −30 | −31 | −30 | −30 | −30 | −28 | −30 | −30 | −30 | −30 | −27 |
| Molecular Weight Mw (×10$^4$) of Base Polymer | 20 | 20 | 20 | 20 | 20 | 20 | 19 | 20 | 20 | 20 | 20 | 20 |
| Mooney Viscosity (ML1 + 4, 100° C.) | 8 | 23 | 28 | 24 | 22 | 8 | 27 | 28 | 27 | 65 | 9 | 19 |

Production Example 1 of Cross-linked Rubber Particles

Firstly, a polymerization vessel was charged with 63 parts by mass of butadiene and 35 parts by mass of styrene as monomers, and 2 parts by mass of divinylbenzene as a cross-linked structure-forming compound, together with 200 parts by mass of water and 4.5 parts by mass of a rosin acid soap. After adjusting the temperature of this polymerization vessel to 5° C., 0.1 parts by mass of p-methane hydroperoxide as a radical polymerization initiator, 0.07 parts by mass of sodium ethylenediaminetetraacetate, 0.05 parts by mass of ferrous sulfate heptahydrate and 0.15 parts by mass of formaldehyde sodium sulfoxylate were added thereto, followed by polymerization for 12 hours to obtain a cross-linked rubber particle dispersion containing cross-linked rubber particles composed of styrene-butadiene copolymerized rubber.

Then, the resulting cross-linked rubber particle dispersion was coagulated with sulfuric acid and a salt to form a crumb, which was dried with a hot air dryer to obtain cross-linked rubber particles (hereinafter also referred to as "cross-linked rubber particles (B 1)") having an average particle size of 200 nm.

Production Example 2 of Cross-linked Rubber Particles

Cross-linked rubber particles (hereinafter also referred to as "cross-linked rubber particles (B2)") composed of styrene-butadiene copolymerized rubber and having an average particle size of 180 nm was obtained by the same technique as in Production Example 1 of Cross-linked Rubber Particles with the exception that 60 parts by mass of butadiene and 33 parts by mass of styrene as monomers, 2 parts by mass of divinylbenzene as a cross-linked structure-forming compound and 5 parts by mass of hydroxyethyl methacrylate as a dispersibility improving compound were used.

Production Example 3 of Cross-linked Rubber Particles

Cross-linked rubber particles (hereinafter also referred to as "cross-linked rubber particles (B3)") composed of styrene-butadiene copolymerized rubber and having an average particle size of 200 nm was obtained by the same technique as in Production Example 1 of Cross-linked Rubber Particles with the exception that 60 parts by mass of butadiene and 33 parts by mass of styrene as monomers, 2 parts by mass of trimethylolpropane trimethacrylate as a cross-linked structure-forming compound and a dispersibility improving compound and 5 parts by mass of hydroxyethyl methacrylate as a dispersibility improving compound were used.

Production Example 4 of Cross-linked Rubber Particles

Cross-linked rubber particles (hereinafter also referred to as "cross-linked rubber particles (B4)") composed of butadiene rubber and having an average particle size of 200 nm was obtained by the same technique as in Production Example 1 of Cross-linked Rubber Particles with the exception that 100 parts by mass of butadiene as a monomer, 2 parts by mass of divinylbenzene as a cross-linked structure-forming compound and 5 parts by mass of hydroxyethyl methacrylate as a dispersibility improving compound were used.

TABLE 3

| | Cross-linked Rubber Particle Number | | | |
|---|---|---|---|---|
| | B1 | B2 | B3 | B4 |
| Water (parts by mass) | 200 | 200 | 200 | 200 |
| 1,3-Butadiene (parts by mass) | 63 | 60 | 60 | 100 |
| Styrene (parts by mass) | 35 | 33 | 33 | — |
| Divinylbenzene (parts by mass) | 2 | 2 | — | 2 |
| Trimethylolpropane Trimethacrylate (parts by mass) | — | — | 2 | — |
| Hydroxyethyl Methacrylate (parts by mass) | — | 5 | 5 | 5 |
| Rosin Acid Soap (parts by mass) | 4.5 | 4.5 | 4.5 | 4.5 |
| p-Methane Hydroperoxide (parts by mass) | 0.1 | 0.1 | 0.1 | 0.1 |
| Sodium Ethylenediaminetetraacetate (parts by mass) | 0.07 | 0.07 | 0.07 | 0.07 |
| Ferrous Sulfate Heptahydrate (parts by mass) | 0.05 | 0.05 | 0.05 | 0.05 |
| Formaldehyde Sodium Sulfoxylate (parts by mass) | 0.15 | 0.15 | 0.15 | 0.15 |

Example 1

With using a plastomill (internal volume: 250 cc) equipped with a temperature controller, 80 parts by mass of conjugated diene polymer (A1) introduced by a functional group(s), 20 parts by mass of butadiene rubber, "BR01" (manufactured by JSR Corporation), 45 parts by mass of an extender oil, "SNH46" (manufactured by Sankyo Yuka Kogyo K.K.), 6.7 parts by mass of carbon black, 84 parts by mass of silica, "Nipsil AQ" (manufactured by Tosoh Silica Corporation, primary average particle size: 15 nm), 10 parts by mass of a silane coupling agent, "Si69" (manufactured by Degussa AG), 2.4 parts by mass of stearic acid, 1.2 parts by mass of an antioxidant, "Nocrac 810NA" (manufactured by Ouchi Shinko Chemical Industrial Co., Ltd.), 3.6 parts by mass of zinc oxide (zinc white) and 20 parts by mass of cross-linked rubber particles (B2) were kneaded (first-step kneading) under kneading conditions of a filling rate of 72% and a rotation number of 60 rpm. Then, a kneaded material obtained by the first-step kneading was cooled to room temperature, and thereafter, 1.8 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.) and 1.8 parts by mass of sulfur were further added thereto, and kneaded (second-step kneading) under conditions of a rotation number of 60 rpm to obtain a rubber composition (hereinafter also referred to as "rubber composition (1)").

The resulting rubber composition (1) was molded, and vulcanized with a vulcanizing press under a temperature condition of 160° C. for a predetermined period of time to obtain a rubber elastic body (hereinafter also referred to as "rubber elastic body (1)").

For the resulting rubber elastic body (1), the following characteristic evaluations were performed. The results thereof are shown in Table 4.

For the compounding ratios of conjugated diene polymer (A1) introduced by a functional group(s), cross-linked rubber particles (B2) and the silica for obtaining rubber composition (1) herein, the contained ratio of conjugated diene polymer (A1) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

(1) Impact Resilience:

With using a tripso type impact resilience test (manufactured by Toyo Seiki Seisaku-sho, Ltd.), measurement was carried out under conditions of 50° C.

The index at the time when the value of the rubber elastic body according to Comparative Example 1 is taken as 100 is shown in Table 4. According to the index, the larger value shows the larger and better impact resilience.

(2) Wet Skid Resistance (0° C. tan δ):

With using a dynamic spectrometer (manufactured by US Rheometric Inc.), measurement was carried out under conditions of a tensile dynamic distortion of 0.14%, an angular velocity of 100 radians per second and a temperature of 0° C.

The index at the time when the value of the rubber elastic body according to Comparative Example 1 is taken as 100 is shown in Table 4. According to the index, the larger value shows the larger and better wet skid resistance.

(3) Low Hysteresis Loss Property (70° C. tan δ):

With using a dynamic spectrometer (manufactured by US Rheometric Inc.), measurement was carried out under conditions of a tensile dynamic distortion of 0.7%, an angular velocity of 100 radians per second and a temperature of 70° C.

The index at the time when the value of the rubber elastic body according to Comparative Example 1 is taken as 100 is shown in Table 4. According to the index, the larger value shows the larger and better low hysteresis loss property.

Example 2

A rubber composition (hereinafter also referred to as "rubber composition (2)") was produced by the same technique as in Example 1 with the exception that conjugated diene polymer (A2) introduced by a functional group(s) was used in place of conjugated diene polymer (A1) introduced by a functional group(s), and a rubber elastic body (hereinafter also referred to as "rubber elastic body (2)") was obtained from the rubber composition (2).

For the resulting rubber elastic body (2), the characteristic evaluations were performed in the same manner as in Example 1. The results thereof are shown in Table 4.

Here, for the compounding ratios of conjugated diene polymer (A2) introduced by a functional group(s), cross-linked rubber particles (B2) and the silica for obtaining rubber composition (2), the contained ratio of conjugated diene polymer (A2) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 3

A rubber composition (hereinafter also referred to as "rubber composition (3)") was produced by the same technique as in Example 1 with the exception that conjugated diene polymer (A3) introduced by a functional group(s) was used in place of a conjugated diene polymer (A 1) introduced by a functional group(s), and a rubber elastic body (hereinafter also referred to as "rubber elastic body (3)") was obtained from the rubber composition (3).

For the resulting rubber elastic body (3), the characteristic evaluations were performed in the same manner as in Example 1. The results thereof are shown in Table 4.

Here, for the compounding ratios of the conjugated diene polymer (A3) introduced by a functional group(s), cross-linked rubber particles (B2) and the silica for obtaining rubber composition (3), the contained ratio of conjugated diene polymer (A3) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 4

A rubber composition (hereinafter also referred to as "rubber composition (4)") was produced by the same technique as in Example 1 with the exception that conjugated diene polymer (A4) introduced by a functional group(s) was used in place of the conjugated diene polymer (A1) introduced by a functional group(s), and a rubber elastic body (hereinafter also referred to as "rubber elastic body (4)") was obtained from the rubber composition (4).

For the resulting rubber elastic body (4), the characteristic evaluations were performed in the same manner as in Example 1. The results thereof are shown in Table 4.

Here, for the compounding ratios of the conjugated diene polymer (A4) introduced by a functional group(s), cross-linked rubber particles (B2) and the silica for obtaining rubber composition (4), the contained ratio of conjugated diene polymer (A4) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 5

A rubber composition (hereinafter also referred to as "rubber composition (5)") was produced by the same technique as in Example 1 with the exception that conjugated diene polymer (A5) introduced by a functional group(s) was used in place of the conjugated diene polymer (A1) introduced by a functional group(s), and a rubber elastic body (hereinafter also referred to as "rubber elastic body (5)") was obtained from the rubber composition (5).

For the resulting rubber elastic body (5), the characteristic evaluations were performed in the same manner as in Example 1. The results thereof are shown in Table 4.

Here, for the compounding ratios of conjugated diene polymer (A5) introduced by a functional group(s), cross-linked rubber particles (B2) and the silica for obtaining rubber composition (5), the contained ratio of conjugated diene polymer (A5) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 6

A rubber composition (hereinafter also referred to as "rubber composition (6)") was produced by the same technique as in Example 1 with the exception that conjugated diene polymer (A6) introduced by a functional group(s) was used in place of conjugated diene polymer (A1) introduced by a functional group(s), and a rubber elastic body (hereinafter also referred to as "rubber elastic body (6)") was obtained from the rubber composition (6).

For the resulting rubber elastic body (6), the characteristic evaluations were performed in the same manner as in Example 1. The results thereof are shown in Table 4.

Here, for the compounding ratios of conjugated diene polymer (A6) introduced by a functional group(s), cross-linked rubber particles (B2) and the silica for obtaining rubber composition (6), the contained ratio of conjugated diene polymer (A6) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 7

A rubber composition (hereinafter also referred to as "rubber composition (7)") was produced by the same technique as in Example 1 with the exception that conjugated diene polymer (A7) introduced by a functional group(s) was used in place of the conjugated diene polymer (A1) introduced by a functional group(s), and a rubber elastic body (hereinafter also referred to as "rubber elastic body (7)") was obtained from the rubber composition (7).

For the resulting rubber elastic body (7), the characteristic evaluations were performed in the same manner as in Example 1. The results thereof are shown in Table 4.

Here, for the compounding ratios of the conjugated diene polymer (A7) introduced by a functional group(s), cross-linked rubber particles (B2) and the silica for obtaining rubber composition (7), the contained ratio of conjugated diene polymer (A7) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 8

A rubber composition (hereinafter also referred to as "rubber composition (8)") was produced by the same technique as in Example 1 with the exception that conjugated diene polymer (A8) introduced by a functional group(s) was used in place of conjugated diene polymer (A1) introduced by a functional group(s), and a rubber elastic body (hereinafter also referred to as "rubber elastic body (8)") was obtained from the rubber composition (8).

For the resulting rubber elastic body (8), the characteristic evaluations were performed in the same manner as in Example 1. The results thereof are shown in Table 4.

Here, for the compounding ratios of conjugated diene polymer (A8) introduced by a functional group(s), cross-linked rubber particles (B2) and the silica for obtaining rubber composition (8), the conjugated diene polymer (A8) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 9

A rubber composition (hereinafter also referred to as "rubber composition (9)") was produced by the same technique as in Example 1 with the exception that conjugated diene polymer (A9) introduced by a functional group(s) was used in place of the conjugated diene polymer (A1) introduced by a functional group(s), and a rubber elastic body (hereinafter also referred to as "rubber elastic body (9)") was obtained from the rubber composition (9).

For the resulting rubber elastic body (9), the characteristic evaluations were performed in the same manner as in Example 1. The results thereof are shown in Table 4.

Here, for the compounding ratios of conjugated diene polymer (A9) introduced by a functional group(s), cross-linked rubber particles (B2) and the silica for obtaining rubber composition (9), the contained ratio of conjugated diene polymer (A9) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 10

A rubber composition (hereinafter also referred to as "rubber composition (10)") was produced by the same technique as in Example 1 with the exception that conjugated diene polymer (A10) introduced by a functional group(s) was used in place of the conjugated diene polymer (A1) introduced by a functional group(s), and a rubber elastic body (hereinafter also referred to as "rubber elastic body (10)") was obtained from the rubber composition (10).

For the resulting rubber elastic body (10), the characteristic evaluations were performed in the same manner as in Example 1. The results thereof are shown in Table 4.

Here, for the compounding ratios of conjugated diene polymer (A10) introduced by a functional group(s), cross-linked rubber particles (B2) and the silica for obtaining rubber composition (10), the contained ratio of conjugated diene polymer (A10) introduced by a functional group(s) in the rubber component is 66.6% by mass, and the contained ratio of cross-linked rubber particles (B2) is 16.7% by mass. Further, the contained ratio of the silica is 70 parts by mass based on 100 parts by mass of the rubber component.

Example 11

A rubber composition (hereinafter also referred to as "rubber composition (11)") was produced by the same technique as in Example 1 with the exception that cross-linked rubber particles (B1) were used in place of cross-linked rubber particles (B2), and a rubber elastic body (hereinafter also referred to as "rubber elastic body (11)") was obtained from the rubber composition (11).

For the resulting rubber elastic body (11), the characteristic evaluations were performed in the same manner as in Example 1. The results thereof are shown in Table 4.

Here, for the compounding ratios of conjugated diene polymer (A1) introduced by a functional group(s), cross-linked rubber particles (B1) and the silica for obtaining rubber composition (11), the contained ratio of conjugated diene polymer (A1) introduced by a functional group(s) in the rubber component is 66.6% by mass, and the contained ratio of cross-linked rubber particles (B1) is 16.7% by mass. Further, the contained ratio of the silica is 70 parts by mass based on 100 parts by mass of the rubber component.

Example 12

A rubber composition (hereinafter also referred to as "rubber composition (12)") was produced by the same technique as in Example 1 with the exception that cross-linked rubber particles (B3) were used in place of cross-linked rubber particles (B2), and a rubber elastic body (hereinafter also referred to as "rubber elastic body (12)") was obtained from the rubber composition (12).

For the resulting rubber elastic body (12), the characteristic evaluations were performed in the same manner as in Example 1. The results thereof are shown in Table 4.

Here, for the compounding ratios of conjugated diene polymer (A1) introuded by a functional group(s), cross-linked rubber particles (B3) and the silica for obtaining rubber composition (12), the contained ratio of conjugated diene polymer (A1) introduced by a functional group(s) in the rubber component is 66.6% by mass, and the contained ratio of cross-linked rubber particles (B3) is 16.7% by mass. Further, the contained ratio of the silica is 70 parts by mass based on 100 parts by mass of the rubber component.

Example 13

A rubber composition (hereinafter also referred to as "rubber composition (13)) was produced by the same technique as in Example 1 with the exception that cross-linked rubber particles (B4) were used in place of cross-linked rubber particles (B2), and a rubber elastic body (hereinafter also referred to as "rubber elastic body (13)") was obtained from the rubber composition (13).

For the resulting rubber elastic body (13), the characteristic evaluations were performed in the same manner as in Example 1. The results thereof are shown in Table 4.

Here, for the compounding ratios of conjugated diene polymer (A1) introduced by a functional group(s), cross-linked rubber particles (B4) and the silica for obtaining rubber composition (13), the contained ratio of conjugated diene polymer (A1) introduced by a functional group(s) in the rubber component is 66.6% by mass, and the contained ratio of cross-linked rubber particles (B4) is 16.7% by mass. Further, the contained ratio of the silica is 70 parts by mass based on 100 parts by mass of the rubber component.

Comparative Example 1

A rubber composition (hereinafter also referred to as "comparative rubber composition (1)") was produced by the same technique as in Example 1 with the exception that without blending cross-linked rubber particles (B2), 20 parts by mass of conjugated diene polymer (A11) introduced by a functional group(s) was used in place of the cross-linked rubber particles (B2). A rubber elastic body (hereinafter also referred to as "comparative rubber elastic body (1)") was obtained from the comparative rubber composition (1).

For the resulting comparative rubber elastic body (1), the characteristic evaluations were performed in the same manner as in Example 1. The results thereof are shown in Table 4.

Here, for the compounding ratios of conjugated diene polymer (A1) introduced by a functional group(s) and the silica for obtaining comparative rubber composition (1), the contained ratio of conjugated diene polymer (A1) introduced by a functional group(s) in the rubber component is 66.6% by mass, and further, the contained ratio of the silica is 70 parts by mass based on 100 parts by mass of the rubber component.

Comparative Example 2

A rubber composition (hereinafter also referred to as "comparative rubber composition (2)") was produced by the same technique as in Example 1 with the exception that the compounding ratio of conjugated diene polymer (A1) introduced by a functional group(s) was changed to 24 parts by mass and that 46.6 parts by mass of conjugated diene polymer (A11) introduced by a functional group(s) was used, and a rubber elastic body (hereinafter also referred to as "comparative rubber elastic body (2)") was obtained from the comparative rubber composition (2).

For the resulting comparative rubber elastic body (2), the characteristic evaluations were performed in the same manner as in Example 1. The results thereof are shown in Table 4.

Here, for the compounding ratios of conjugated diene polymer (A1) introduced by a functional group(s), cross-linked rubber particles (B2) and the silica for obtaining comparative rubber composition (2), the contained ratio of a conjugated diene polymer (A1) introduced by a functional group(s) in the rubber component is 20.0% by mass, and the contained ratio of cross-linked rubber particles (B2) is 16.7% by mass. Further, the contained ratio of the silica is 70 parts by mass based on 100 parts by mass of the rubber component.

Comparative Example 3

A rubber composition (hereinafter also referred to as "comparative rubber composition (3)") was produced by the same technique as in Example 1 with the exception that the compounding ratio of conjugated diene polymer (A1) introduced by a functional group(s) was changed to 95 parts by mass and that the compounding ratio of cross-linked rubber particles (B2) was changed to 5 parts by mass, and a rubber elastic body (hereinafter also referred to as "comparative rubber elastic body (3)") was obtained from the comparative rubber composition (3).

For the resulting comparative rubber elastic body (3), the characteristic evaluations were performed in the same manner as in Example 1. The results thereof are shown in Table 4.

Here, for the compounding ratios of conjugated diene polymer (A1) introduced by a functional group(s), cross-linked rubber particles (B2) and the silica for obtaining comparative rubber composition (3), the contained ratio of conjugated diene polymer (A1) introduced by a functional group(s) in the rubber component is 4.1% by mass, and the contained ratio of cross-linked rubber particles (B2) is 16.7% by mass. Further, the contained ratio of the silica is 70 parts by mass based on 100 parts by mass of the rubber component.

Comparative Example 4

A rubber composition (hereinafter also referred to as "comparative rubber composition (4)") was produced by the same technique as in Example 1 with the exception that conjugated diene polymer (A11) introduced by a functional group(s) was used in place of the conjugated diene polymer (A1) introduced by a functional group(s) and that cross-linked rubber particles (B3) was used in place of cross-linked rubber particles (B2), and a rubber elastic body (hereinafter also referred to as "comparative rubber elastic body (4)") was obtained from the comparative rubber composition (4).

For the resulting comparative rubber elastic body (4), the characteristic evaluations were performed in the same manner as in Example 1. The results thereof are shown in Table 4.

Comparative Example 5

A rubber composition (hereinafter also referred to as "comparative rubber composition (5)") was produced by the same technique as in Example 1 with the exception that conjugated diene polymer (A12) introduced by a functional group(s) was used in place of the conjugated diene polymer (A1) introduced by a functional group(s) and that cross-linked rubber particles (B1) was used in place of cross-linked rubber particles (B2), and a rubber elastic body (hereinafter also referred to as "comparative rubber elastic body (5)") was obtained from the comparative rubber composition (5).

For the resulting comparative rubber elastic body (5), the characteristic evaluations were performed in the same manner as in Example 1. The results thereof are shown in Table 4.

Comparative Example 6

A rubber composition (hereinafter also referred to as "comparative rubber composition (6)") was produced by the same technique as in Example 1 with the exception that conjugated diene polymer (A12) introduced by a functional group(s) was used in place of the conjugated diene polymer (A1) introduced by a functional group(s) and that cross-linked rubber particles (B3) was used in place of cross-linked rubber particles (B2), and a rubber elastic body (hereinafter also referred to as "comparative rubber elastic body (6)") was obtained from the comparative rubber composition (6).

For the resulting comparative rubber elastic body (6), the characteristic evaluations were performed in the same manner as in Example 1. The results thereof are shown in Table 4.

TABLE 4

| | | | | Examples | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 |
| Rubber Composition | Rubber Component | Conjugated Diene Polymer Introduced by a Functional Group(s) | Kind | A1 | A2 | A3 | A4 | A5 | A6 | A7 | A8 | A9 | A10 | A1 | A1 | A1 |
| | | | Contained Ratio (parts by mass) | 80 | 80 | 80 | 80 | 80 | 80 | 80 | 80 | 80 | 80 | 80 | 80 | 80 |
| | | Cross-linked Rubber Particles | Kind | B2 | B2 | B2 | B2 | B2 | B2 | B2 | B2 | B2 | B2 | B1 | B3 | B4 |
| | | | Contained Ratio (parts by mass) | 20 | 20 | 20 | 20 | 20 | 20 | 20 | 20 | 20 | 20 | 20 | 20 | 20 |
| | | Butadiene Rubber | Contained Ratio (parts by mass) | 20 | 20 | 20 | 20 | 20 | 20 | 20 | 20 | 20 | 20 | 20 | 20 | 20 |
| Evaluation | Mooney Viscosity (ML1 + 4, 100° C.) | | | 84 | 85 | 86 | 82 | 86 | 84 | 84 | 90 | 88 | 85 | 86 | 88 | 90 |
| | Impact Resilience | | | 112 | 112 | 115 | 112 | 113 | 115 | 114 | 112 | 111 | 112 | 109 | 115 | 116 |
| | Wet Skid Resistance (0° C. tan δ) | | | 110 | 105 | 108 | 106 | 106 | 110 | 107 | 109 | 110 | 112 | 108 | 105 | 108 |
| | Low Hysteresis Loss Property (70° C. tan δ) | | | 115 | 107 | 107 | 106 | 107 | 105 | 108 | 110 | 110 | 111 | 110 | 110 | 112 |

| | | | | Comparative Examples | | | | | |
|---|---|---|---|---|---|---|---|---|---|
| | | | | 1 | 2 | 3 | 4 | 5 | 6 |
| Rubber Composition | Rubber Component | Conjugated Diene Polymer Introduced by a Functional Group(s) | Kind | A1 | A11 | A1 | A11 | A1 | A11 | A12 | A12 |
| | | | Contained Ratio (parts by mass) | 80 | 20 | 24 | 56 | 95 | 80 | 80 | 80 |
| | | Cross-linked Rubber Particles | Kind | — | B2 | B2 | B3 | B1 | B3 |
| | | | Contained Ratio (parts by mass) | — | 20 | 5 | 20 | 20 | 20 |
| | | Butadiene Rubber | Contained Ratio (parts by mass) | 20 | 20 | 20 | 20 | 20 | 20 |
| Evaluation | Mooney Viscosity (ML1 + 4, 100° C.) | | | 82 | 84 | 90 | 85 | 95 | 95 |
| | Impact Resilience | | | 100 | 90 | 85 | 95 | 105 | 102 |
| | Wet Skid Resistance (0° C. tan δ) | | | 100 | 80 | 90 | 80 | 82 | 84 |
| | Low Hysteresis Loss Property (70° C. tan δ) | | | 100 | 75 | 95 | 70 | 71 | 72 |

The invention claimed is:

1. A rubber composition, comprising:
   a rubber component; and
   silica,
   wherein the silica is included in an amount of from 20 to 100 parts by mass based on 100 parts by mass of the rubber component, and
   the rubber component comprises from 30 to 95% by mass of a conjugated diene polymer comprising a hydrocarbyloxysilyl group, and from 5 to 70% by mass of cross-linked rubber particles based on the total mass of rubber component.

2. The rubber composition of claim 1, wherein the conjugated diene polymer further comprises at least one functional group selected from the group consisting of a primary amino group, a secondary amino group, a tertiary amino group, a thiol group, an epoxy group, a thioepoxy group, an oxetane group, and a hydrocarbylthio group.

3. The rubber composition of claim 1, wherein the cross-linked rubber particles comprise a cross-linked rubber comprising at least one rubber polymer selected from the group consisting of isoprene rubber, butadiene rubber, styrene-butadiene copolymerized rubber, styrene-isoprene copolymerized rubber, butadiene-isoprene copolymerized rubber, styrene-butadiene-isoprene copolymerized rubber, styrene-acrylonitrile-butadiene copolymerized rubber, acrylonitrile-butadiene copolymerized rubber, ethylene-α-olefin copolymerized rubber, ethylene-α-olefin-diene copolymerized rubber, chloroprene rubber, halogenated butyl rubber, polysiloxane rubber, and a graft polymer obtained by graft polymerizing at least one of a conjugated diene compound and a styrene compound thereto.

4. The rubber composition of claim 3, wherein the cross-linked rubber is obtained by a process comprising subjecting monomers to emulsion polymerization or suspension polymerization, and the monomers comprise a multifunctional compound for forming a cross-linked structure in an amount of from 0.5 to 5 parts by mass based on 100 parts by mass of the monomers subjected to the polymerization.

5. The rubber composition of claim 4, wherein the cross-linked rubber has a structural unit derived from at least one compound selected from the group consisting of hydroxyethyl methacrylate, hydroxypropyl methacrylate, hydroxybutyl methacrylate, ethylene glycol dimethacrylate, trimethylolpropane trimethacrylate, pentaerythritol tetramethacrylate, tert-butoxydimethylsilylstyrene, and isopropoxy-dimethylsilylstyrene.

6. The rubber composition of claim 1, wherein an average particle size of the cross-linked rubber particles is from 10 to 800 nm.

7. The rubber composition of claim 1, wherein the rubber component further comprises at least one selected from the group consisting of natural rubber, butadiene rubber, butyl rubber, synthetic isoprene rubber, styrene-butadiene copolymerized rubber, ethylene-α-olefin copolymerized rubber, ethylene-α-olefin-diene copolymerized rubber, acrylonitrile-butadiene copolymerized rubber, chloroprene rubber, and halogenated butyl rubber.

* * * * *